United States Patent [19]

Miksitz

[11] Patent Number: 5,044,325
[45] Date of Patent: Sep. 3, 1991

[54] VENTILATED LITTER BOX

[75] Inventor: Frank J. Miksitz, Phillipsburg, N.J.

[73] Assignee: UFI, Inc., Phillipsburg, N.J.

[21] Appl. No.: 626,693

[22] Filed: Dec. 13, 1990

[51] Int. Cl.⁵ .............................................. A01K 29/00
[52] U.S. Cl. ...................................................... 119/165
[58] Field of Search ........................ 119/161, 163, 165; 4/209 R, 213, 472, 475, 477, 482

[56] References Cited

U.S. PATENT DOCUMENTS

| | | | |
|---|---|---|---|
| 4,095,559 | 6/1978 | Griffith | 119/165 |
| 4,196,477 | 4/1980 | Stewart | 4/472 X |
| 4,546,727 | 10/1985 | Anderson | 119/165 |

*Primary Examiner*—Gene Mancene
*Assistant Examiner*—R. Thomas Price
*Attorney, Agent, or Firm*—Fisher, Christen & Sabol

[57] ABSTRACT

An animal litter box includes a housing and a tray for containing a bed of litter material. The tray is provided with a porous bottom spaced from the bottom of the housing to define an air space. An exhaust fan is connected to a port through the wall of the housing to draw air downwardly through the litter bed to dry the litter and exhaust the litter odors. The exhaused air may be passed through the odor absorbing filter assembly to deodorize the air before venting the air.

17 Claims, 3 Drawing Sheets

VENTILATED LITTER BOX

FIELD OF THE INVENTION

The present invention is directed to an animal litter box including a device for exhausting odors and drying the litter. More particularly, the invention is directed to a ventilated litter box having an odor absorbing material to remove odors from air drawn downwardly through the litter bed before exhausting the air to a remote location.

BACKGROUND OF THE INVENTION

Many domestic pets and particularly cats are often kept indoors and require that a suitable litter box or container be available for use by the animal. Animal litter products are generally an absorbent material such as granulated clay particles or vegetable material. Those materials have the advantage of being absorbent and a natural attractant to the animal. Litter boxes, however, have the distinct disadvantage of requiring regular cleaning or changing of the litter material. Litter box also usually result in the emanation of malodors, typically referred to as litter box odors. To prevent odors from emanating throughout the pet owner's house, it is usually necessary to change the litter daily. The burden and expense of daily changing of litter is a major factor in the pet owners failure to routinely change the litter.

In order to minimize the burden and unpleasantness of changing a litter box numerous devices have been developed. These devices include, for example, containers to receive the spent litter and devices to replace the spent litter with fresh litter. Other devices include systems to vent animal waste odors away from the immediate area and systems to mask the odor being Emitted from the litter box. One example of such a device is disclosed in U.S. Pat. No. 3,428,026 where a litter box is provided with an enclosure to contain the waste odors. A solid cake of deodorant material is contained within the enclosure to mask the odors by continuously releasing the deodorant.

Another example of a device intended to control animal waste odors is disclosed in U.S. Pat. No. 3,793,989. In this device an enclosure is provided to contain the animal litter and the litter box. An electric powered fan is included within the confines of the enclosure to circulate and distribute a deodorizer from a solid, semisolid or liquid deodorizer. The above-noted devices attempt to control odors primarily by containment and masking of the odors. These devices are deficient in that they do not remove the odors from the air or remove the odor-causing waste material from the litter.

Other devices have been developed to attempt to remove pet odors from the air such as disclosed in U.S. Pat. No. 3,487,814. This device includes a housing to enclose a litter box. A fan is mounted in the upper portion of the housing to draw air and odors from the litter box through a screen which is impregnated with an odor absorbing material. Another example of an odor elimination device is disclosed in U.S. Pat. No. 4,095,559. The device includes an enclosure which fits on top of a litter box to form a partial cover. The enclosure defines a partial top cover and includes a skirt portion having an air channel. An electric fan is connected to the top cover to draw air from the litter box and vents the air to the outside.

The previous litter devices used heretofore do not adequately remove odors from the litter box or eliminate the release of odors to the room. The previous devices further do not provide a litter box which is able to effectively dry the litter while preventing the release of odors to the room. There is, therefore, a need for a litter box which is simple and inexpensive to manufacture and is able to effectively remove and control litter box odors.

SUMMARY OF THE INVENTION

The present invention is directed to an animal litter box having a device to exhaust the litter odors to a remote location. The litter box is constructed from a tray or housing having a bottom portion and upwardly extending walls which terminate at an outwardly extending flange. A porous support member to support the litter material is spaced above the bottom portion of the housing to define an air space below the litter bed. A fan is connected to the housing through a coupling to draw air from the air space. The fan draws air downwardly through the litter bed to dry the litter and prevent the escape of odors. The air may be exhausted to a remote location.

In a further embodiment of the invention, the air exhausted from the litter box is passed through an odor absorbing filter assembly to deodorize the air by absorbing the waste odors on the filter material. The deodorized air may be vented to a remote location, vented to the same environment of the litter box or returned to the upper portion of the litter bed.

The litter box, in an alternative embodiment, includes a housing having a bed of odor absorbing filter material spaced above a bottom portion of the housing. A bed of litter is spaced above the filter material. The housing is provided with a fan to draw air downwardly through the litter bed and filter bed to dry the litter and odorize the air. In embodiments of the invention, the litter box is provided with a top cover supported on the housing and having an opening for ingress and egress by the animal. The deodorized air drawn from the litter may be vented back to the top cover.

BRIEF DESCRIPTION OF THE DRAWINGS

The present invention is illustrated in the drawings of which the following is a brief description.

DETAILED DESCRIPTION OF THE INVENTION

The present invention is directed to an animal litter box having a fan or blower to draw air through the litter material. The litter box is provided with a foraminous bottom to support the litter material. The blower is connected to the litter box to withdraw the odors from the litter and dry the litter by the air passing downward through the litter bed.

Figure 1:
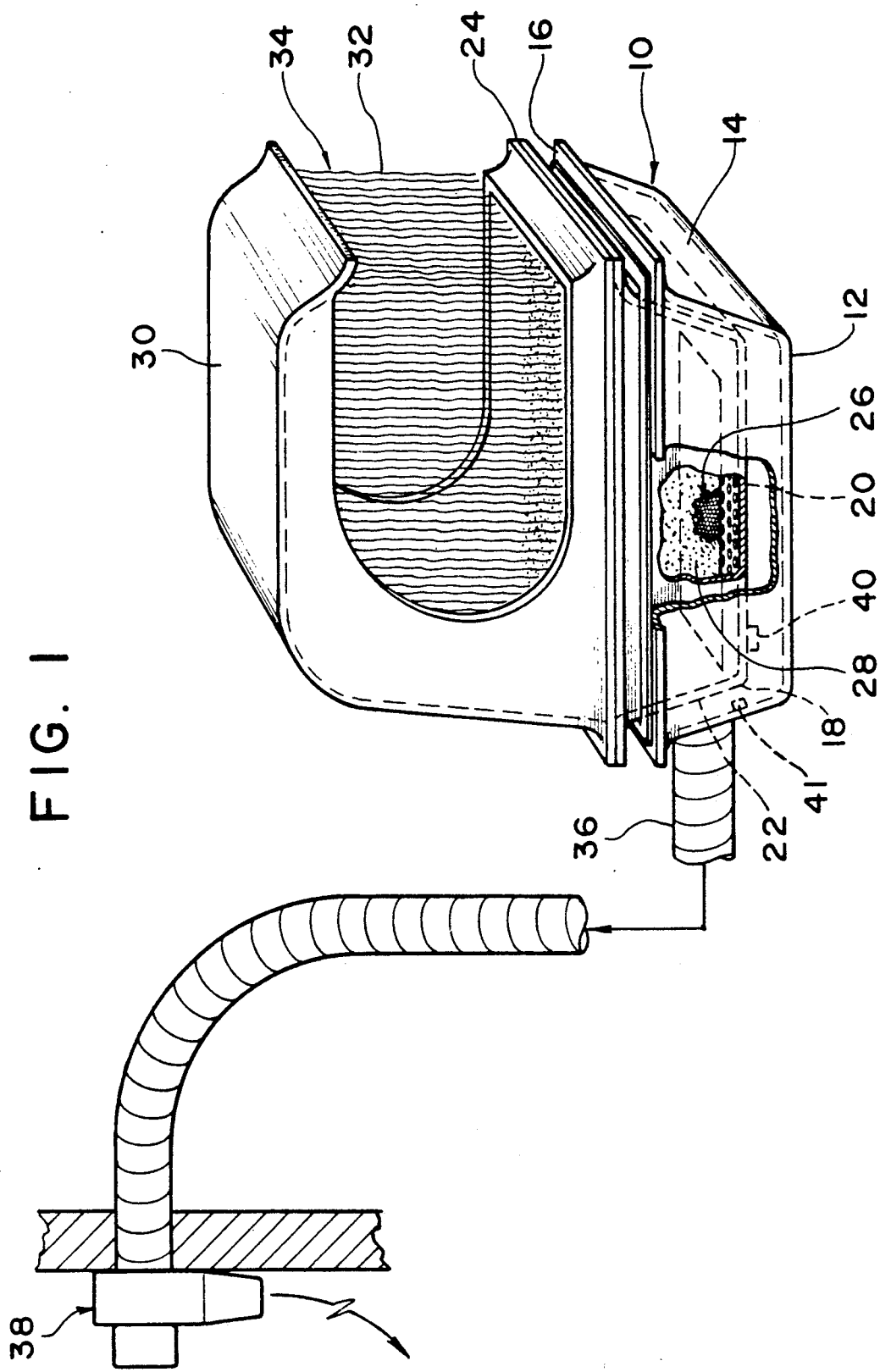
FIG. 1 is a perspective view of a preferred embodiment of the invention.

A preferred embodiment of the invention is illustrated in FIG. 1. The litter box includes an open-top bottom tray lo having a bottom panel 12 and upwardly extending sloping side walls 14. An outwardly extending flange portion 16 depends from the upper edge of the walls 14 and extends around the perimeter of the tray. An inner tray 18 is provided with sloping walls to allow nesting within the bottom tray 10. The inner tray 18 includes a porous bottom portion 20 and upwardly sloping walls 22. A depending skirt portion 24 extends outwardly from the upper edge of the wall 22 around the perimeter which is spaced with a thick rubber gasket and rests on the flange portion 16 of the bottom tray 10. The inner tray 18 is a modified duplicate of the bottom tray 10 equally dimensioned such that it can be nested within the bottom tray. The side walls 22 and bottom portion 20 of the inner tray 18 are preferably spaced from the walls 14 and bottom panel 12 of the bottom tray 10. In a preferred embodiment, the bottom portion is porous substantially throughout the entire bottom surface area.

The porous bottom portion 20 of the inner tray may be a perforated plate-like bottom. Alternatively, the bottom of the inner tray may have a lattice or screen-like structure. A porous mat 26 may be placed over the porous bottom portion to support a litter material. Alternatively a porous foam filter-like mat may be placed over the bottom portion 20. The mat may be, for example, a polyester-polyurethane filter material. The litter material 28 is received on the mat 26 and retained in the inner tray for use by the animal. In the embodiment shown in FIG. 1, the litter box is provided with a top removable enclosure 30 having an entrance port 32 to allow access by the animal to the litter material. The entrance port 32 may be provided with a fringe curtain 34 to obstruct the view of the litter material and to contain waste odors. Also the cat might like privacy when it visits the box.

The skirt portion 24 of the inner tray is preferably provided with a sealing member in the form of a thick rubber gasket to form an effective seal between the skirt portion 24 and the flange portion 16 of the bottom tray 10. In a preferred embodiment of the invention the rubber gasket material is adhesively attached to skirt portion 24 on the underside surface opposing the upper face of flange portion 16 of the bottom tray 10. Alternatively, the rubber gasket material may be adhesively attached to the upper surface of the flange 16. The side wall 14 of the bottom tray 10 is provided with a connection to receive a flexible hose member 36. In the embodiment shown in FIG. 1, the hose member 36 is connected to the tray and extends to an exhaust port in a wall to vent the air and odors to an outside location. As shown, the air is exhausted through a wall, although it may also be vented through a window or to a remote location. A fan 38 is attached to the end of the flexible hose member 36 to draw air through the hose from the litter box. As shown in FIG. 1, the fan is attached to the end of the hose at a remote location from the litter box so as not to frighten the animal and deter use of the litter box. In an alternative embodiment of the invention, the fan 38 may be mounted on the wall 14 of the bottom tray 10. The hose 36 is preferably connected to the fan to exhaust the air and odors to another location. In this embodiment, the fan is preferably sufficiently small and quiet so as not to act as a deterrent to use of the litter by the animal.

The spacing between the inner tray 20 and the bottom tray 10 defines an air space of reduced pressure when connected to the fan 38 and the fan is operated. The fan 38 produces a reduced pressure in the bottom tray 10 below the inner tray 20 supporting the litter. Air is drawn downwardly through the entire bed of litter to dry the litter and exhaust the waste odors to the external environment and prevent the release of the odors to the room. Preferably the bottom portion of the inner tray is porous to the flow of air throughout the entire surface to allow the air to pass through the entire bed of litter and dry the litter.

The fan 38 may be continuously operated and provided with an on-off switch. In one embodiment the fan may be connected to a control timer to actuate the fan at predetermined and periodic intervals. In a further embodiment of the invention the inner tray 20 may include a weight sensor 40 connected to a switching device to actuate the fan. In this embodiment the fan may be actuated by the sensor detecting the presence of an animal in the litter box. The sensor may be, for example, a weight actuated sensor or an optical sensor. The weight of the animal may trip a weight sensor and actuate the fan for a predetermined period of time to dry the litter and remove the odors. The litter box may further include a moisture sensor 41 to operate the fan until the moisture level in the litter box is reduced to a predetermined level.

Figure 2:
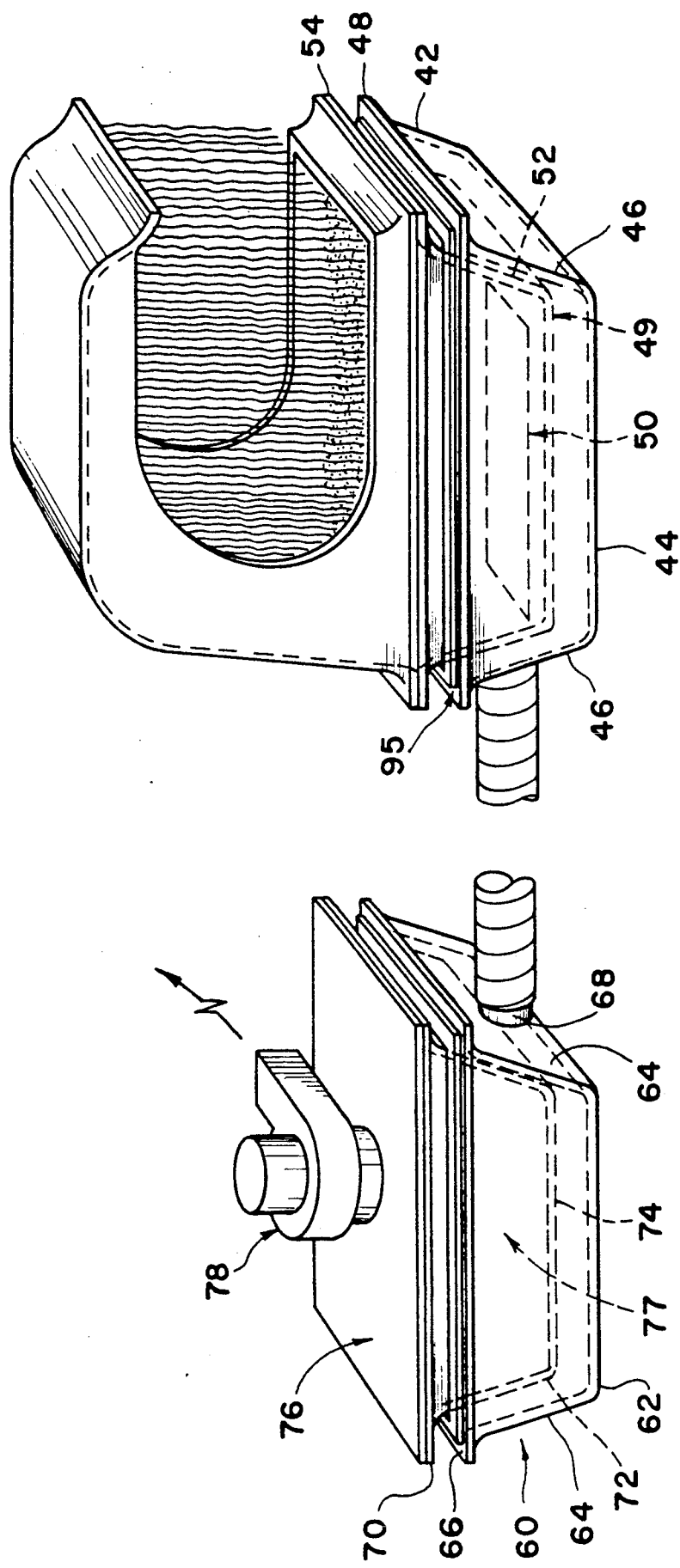
FIG. 2 is a perspective view of an alternative preferred embodiment of the invention.

In a further embodiment of the invention as shown in FIG. 2, the litter box includes a bottom tray 42 having a bottom panel 44 and upright side walls 46. A depending flange 48 extends outwardly from the upper edges of the sloping side walls 46 around the perimeter thereof. An inner tray 49 is provided with a porous bottom panel 50 and non-porous and upstanding sloping walls 52. The inner tray 49 is dimensioned the same a the bottom tray 42 to allow nesting within bottom tray as shown in FIG. 2. A depending skirt or flange portion 54 extends from the upper edges of the sloping walls 52 of the inner tray. A rubber gasket material 95 is provided on the underside of the flange 54 of inner tray 49. The inner tray is nested in the bottom tray with the skirt portion 54 supported on the gasket 95 on the flange 48 such that the sloping walls and bottom panel of the inner tray are spaced from the walls and bottom panel of the bottom tray.

A hose connection is provided and extends from a side wall of the bottom tray. A flexible air hose is attached to the connection and extends to a filter assembly 60. The filter assembly includes a housing 62 having upstanding sloping walls 64. The upper edges of the walls 64 are provided with a depending flange 66 extending outwardly from the wall to form a substantially horizontal support surface. A hose connection 68 extends through the wall 64 to receive the hose from the little box. An inner tray 70 equally dimensioned as housing 62 is nested within the housing 62 as shown in FIG. 2. The inner tray also includes side sloping walls 72 to allow nesting of trays, a bottom wall 74 and top cover 76. In a preferred embodiment, the side sloping walls 72 are not perforated and only the bottom wall 74 is perforated to allow the free flow of air upwardly through the filter assembly. An odor absorbing material 77 is provided in the inner tray for contact with the air from the litter box. A fan 78 is mounted on the cover 76 and is in communication with a port (not shown) to draw air outwardly from the filter assembly 60. In operation of the device shown in FIG. 2, the fan 78 causes air to be drawn downwardly through the litter bed and through the porous bottom panel of the inner tray to dry the bed of litter and draw the odors away from the litter. The odorous air is then drawn through the hose and passed through the filter assembly and the odor absorbing material. The fan 78 may discharge the filtered and deodorized air back to the room or to a remote location as desired.

The odor absorbing material contained in the filter assembly may be a suitable absorbent or adsorbent as well known by those skilled in the art. In the preferred embodiment, the odor-absorbing filter material is an activated charcoal although other materials may be used. Exemplary filter materials may include zeolites, alumina, silica, silica gel or organomodified silicas which are capable of absorbing odorous substances from the air. The filter material may also include a deodorizing agent or an odor masking agent. The deodorizer or the odor masking agent may be a solid or liquid. A liquid component is preferably dispersed within the filter assembly by an aerosol dispenser or by a wick. The filter assembly may also contain a moisture absorbent, such as silica gel, to remove excess moisture from the air and prevent condensation within the filter assembly.

Figure 3:
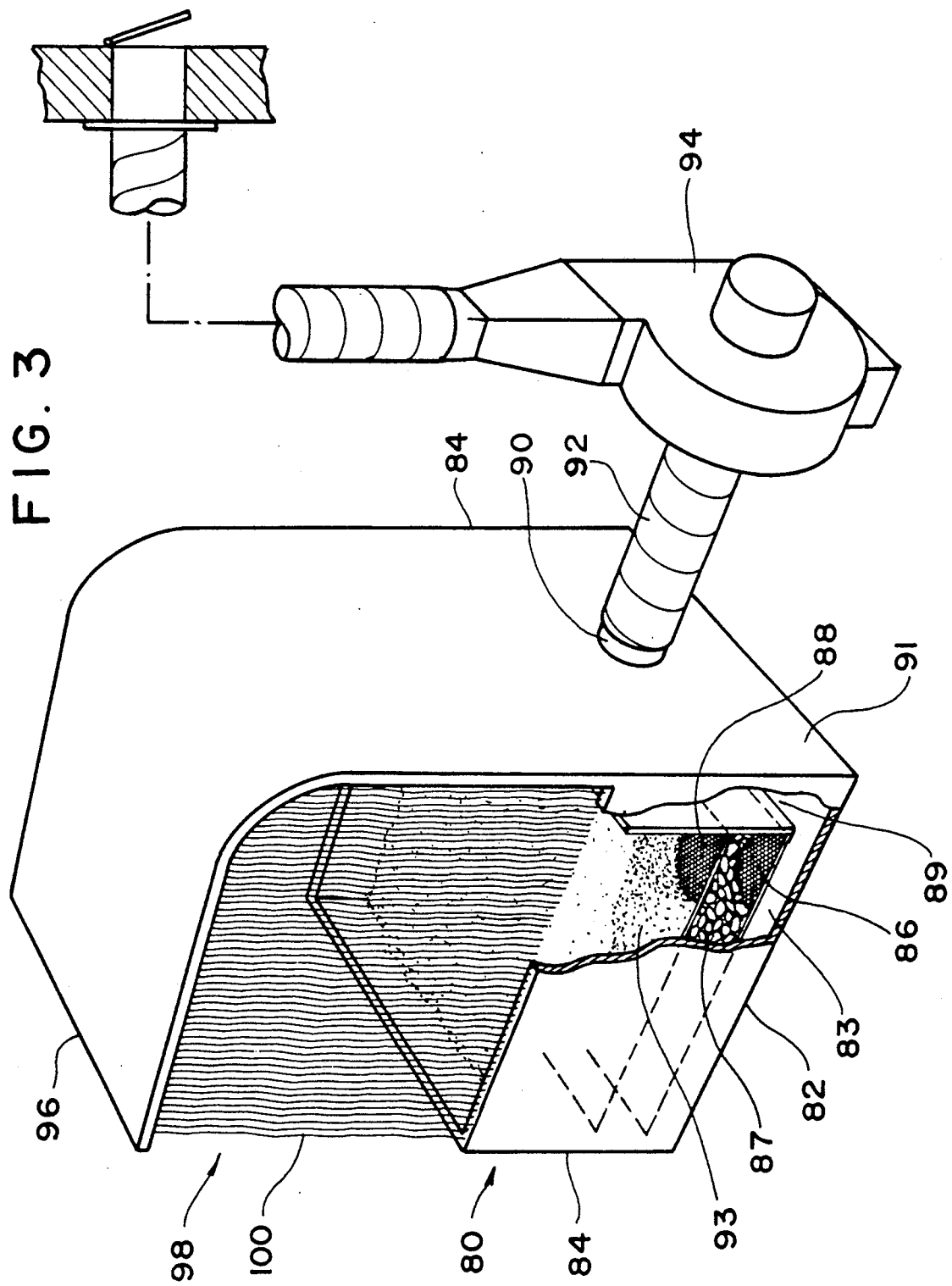
FIG. 3 is a perspective view of a further embodiment of the invention.

In a further embodiment shown in FIG. 3, the litter box includes a housing 80 having a bottom panel 82 and upstanding litter bed side walls 84. A first support shelf 86 is positioned in the housing 80 and spaced above the bottom panel 82 to define an air space 83. The support shelf 86 may be a screen or other perforated plate-like member which extends substantially a width and length of the inner housing area. An odor absorbing material 87 is supported on the first shelf. A second litter support shelf 88 is spaced above the first shelf 86 and extends the width and length of the inner housing area. The animal litter 93 is placed on the second shelf within the housing. The second shelf 88 is a screen or other suitable porous substrate to allow air to be drawn downwardly through the litter and the shelf. An air chamber 89 is defined by an outer wall 91 parallel to the end wall 84 of the housing 80. The air chamber is in communication with the air space 83. A hose connection 90 extends from the outer wall 91 of the air chamber 89. Hose 92 is attached to the connection 90 and extends to a fan 94 to draw air from the air chamber 89 and air space 83 and vents the air to a remote location, such as to the outside air. In operation, the fan 94 is actuated to produce a reduced pressure in the space between the first support shelf 86 and the bottom of the housing. Air is drawn from the upper surface of the housing downwardly through the litter bed to dry the litter and draw the odors away from litter. The odor-laden air is passed through the odor absorbing filter material to remove the odor-causing substances from the air. The deodorized air passing through air chamber 89 may then be vented to a location remote from the litter box or vented to the same room as the litter box.

The litter box of FIG. 3 is preferably provided with a top closure 96 having an opening 98 for the animal to enter the litter box. The top closure 96 may also be provided with a fringe curtain 100 to form a closure for the opening 98.

The litter material may be a conventionally used litter such as granulated clay or vegetable matter, for example, shredded vegetation or wood chips. In a preferred embodiment of the invention the litter material is a substantially non-absorbent litter such that liquid waste will not be absorbed and can be easily dried by the flow of air through the bed. The litter may contain fragrances, disinfectants or other odor-masking materials.

The operation of the device is readily apparent from consideration of the illustrated embodiments. In each of the embodiments the litter is supported on a foraminous substrate and air is drawn downwardly through substantially the entire bed of litter. The air is preferably drawn at a sufficient volume to dry the litter and draw the odors from the litter. In a preferred form of the invention the air is passed through an odor-absorbing filter material to remove the odor-causing substances from the air whereby the air can be vented back to the room. Alternatively, the deodorized air may be vented outdoors or to another remote location. The deodorized air may further be vented back to the top enclosure of the litter box.

It will be appreciated that the operation of the device exhausts the litter box odors from the litter box and prevents the escape of the odors to the room. The removal of the odors and drying of the litter results in an increase in the useful life of the litter. The device may be constructed from any suitable material although synthetic polymeric materials such as polyethylene or polypropylene are preferred. The litter box is lightweight and easily assembled and easily cleaned.

What is claimed is:

1. An animal litter box comprising a housing having a bottom portion and upwardly extending walls terminating at a top edge, a litter support surface to receive a bed of animal litter positioned in said housing and extending substantially the dimension of the housing and being spaced above and substantially parallel to the bottom portion of the housing, said litter support further being porous to the flow of air substantially throughout its width and length, fan means attached to said housing and in communication with a space between said bottom portion of the housing and litter support surface whereby said fan draws air downwardly through said bed of litter to dry said litter and exhaust air from the litter box.

2. The litter box of claim 1 wherein said litter support surface is a perforated support.

3. The litter box of claim 2 wherein a porous foam mat is provided on said porous bottom surface.

4. The litter box of claim 1 wherein said litter support surface is a woven wire mesh.

5. The litter box of claim 1 wherein said housing includes a connection means in communication with the space between the bottom portion and litter support surface and a conduit means is connected to the connection means and extends to said fan means.

6. The litter box of claim 1 including a removable top section disposed on said litter box, said top section including means to define an opening for ingress and egress by an animal.

7. The animal litter box of claim 6 wherein filter means includes at least one odor absorbing component selected from the group consisting of activated charcoal, zeolites, silica gel and organomodified silica.

8. The litter box of claim 6 wherein said filter means includes a first tray having a bottom and upwardly sloping walls terminating at an outwardly extending flange, a second tray containing at least one odor absorbing component and having a bottom portion and upwardly sloping walls terminating at an outwardly extending flange, said second tray nested within said first tray whereby said walls and bottom portion of the second tray are spaced from the bottom portion and walls of the first tray, gasket means disposed between said flanges and a top portion substantially closing said second tray.

9. The litter box of claim 8 wherein said fan means is in communication with an opening in said top portion of the filter assembly and wherein said first tray of the filter assembly includes means defining an air inlet in communication with said space between said housing and said litter support tray.

10. An animal litter box comprising a housing having a bottom portion and upwardly sloping side walls terminating at an upper edge and having an outwardly extending flange, a litter support tray having a bottom portion and upwardly sloping side walls terminating at an outwardly extending flange, said litter support tray complementing the housing and being nested therein with said outwardly extending flange supported on said upper edge of the housing, gasket means disposed between said flanges and wherein said bottom portion and walls of the litter support tray are spaced from the respective bottom portion and walls of said housing, wherein said bottom portion of the litter support tray is porous to the flow of air substantially throughout the tray, fan means attached to said housing and in communication with a space between said housing and said litter support tray to exhaust air from said space whereby air is drawn substantially downwardly through said bed of litter to dry the litter and exhaust odors, and an odor absorbing filter means in communication with said fan means to deodorize said air.

11. The litter box of claim 7 wherein said bottom portion of said litter support tray is perforated throughout to allow the flow of air therethrough.

12. The litter box of claim 11 including an air permeable substrate on said bottom portion of said litter support tray.

13. The litter box of claim 7 including sensor means to sense the presence of an animal in said litter box actuate said fan means.

14. The litter box of claim 7 including control means to actuate said fan means at preselected time intervals.

15. The litter box of claim 14 wherein said housing includes moisture sensing means to sense a moisture level of litter contained in said litter box, said moisture sensing means operatively connected to said control means to actuate said fan means.

16. An animal litter box comprising a housing having a bottom portion and upwardly extending walls terminating at an upper edge, a first porous support within said housing and spaced from said bottom portion to define an air space therebetween, odor absorbing filter means supported by said first porous support, a second porous support within said housing and spaced above said first support, said second support capable of supporting a bed of litter material, fan means attached to said housing and in communication with said air space to exhaust air and cause air to flow downwardly through said litter box, wherein said air flows substantially downwardly through said bed of litter and downwardly through said odor absorbing filter means whereby said litter is dried and said air is deodorized.

17. The litter box of claim 16 wherein said first and second porous supports are perforated to allow air to flow through said litter bed.

* * * * *